United States Patent
Zytaruk

(10) Patent No.: US 10,572,246 B2
(45) Date of Patent: Feb. 25, 2020

(54) LIVE UPDATE OF A KERNEL DEVICE MODULE

(71) Applicant: ATI Technologies ULC, Markham (CA)

(72) Inventor: Kelly Donald Clark Zytaruk, Georgetown (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/117,959

(22) Filed: Aug. 30, 2018

(65) Prior Publication Data

US 2019/0332373 A1    Oct. 31, 2019

Related U.S. Application Data

(60) Provisional application No. 62/663,860, filed on Apr. 27, 2018.

(51) Int. Cl.
*G06F 8/656* (2018.01)
*G06F 9/48* (2006.01)

(52) U.S. Cl.
CPC ............ *G06F 8/656* (2018.02); *G06F 9/485* (2013.01)

(58) Field of Classification Search
CPC ........................................... G06F 8/656
USPC ........................................ 717/170
See application file for complete search history.

(56) References Cited

U.S. PATENT DOCUMENTS

| | | | | |
|---|---|---|---|---|
| 2005/0015702 A1* | 1/2005 | Shier | .................. | G06F 11/2273 714/776 |
| 2005/0246718 A1* | 11/2005 | Erlingsson | ............ | G06F 9/4411 719/317 |
| 2006/0242402 A1* | 10/2006 | Swift | .................. | G06F 11/1482 713/2 |
| 2007/0174849 A1 | 7/2007 | Cheung et al. | | |
| 2007/0233775 A1 | 10/2007 | Jackson et al. | | |
| 2008/0082975 A1 | 4/2008 | Oney et al. | | |
| 2009/0150909 A1* | 6/2009 | Barreto | ................. | G06F 9/4411 719/324 |

(Continued)

OTHER PUBLICATIONS

International Search Report and Written Opinion in International Application No. PCT/IB2019/053461, dated Jul. 5, 2019, 12 pages.

*Primary Examiner* — Qing Chen
*Assistant Examiner* — Clint Thatcher
(74) *Attorney, Agent, or Firm* — Meyertons Hood Kivlin Kowert and Goetzel PC; Rory D. Rankin

(57) ABSTRACT

Systems, apparatuses, and methods for implementing live device driver updates are disclosed. When a processor loads a given version of a device driver, the given version registers with a proxy module rather than registering with the operating system. If a previous version of the device driver is already running, the proxy module provides the given version with a pointer to the previous version. The given version uses the pointer to retrieve static data from the previous version. After the previous version is quiesced, the given version retrieves transient data from the previous version and then takes over as the running version of the device driver. Subsequent versions of the device driver are able to replace previous versions in a similar manner. Also, previous versions of the device driver are able to replace subsequent versions in a similar manner in the case of downgrading.

20 Claims, 12 Drawing Sheets

(56) References Cited

U.S. PATENT DOCUMENTS

| | | | |
|---|---|---|---|
| 2016/0112262 A1* | 4/2016 | Johnson | G06F 9/45504 |
| | | | 709/221 |
| 2016/0188358 A1 | 6/2016 | Kim et al. | |
| 2019/0012195 A1 | 1/2019 | Hirose | |
| 2019/0220260 A1* | 7/2019 | Gutman | G06F 21/00 |

* cited by examiner

LIVE UPDATE OF A KERNEL DEVICE MODULE

CROSS REFERENCE TO RELATED APPLICATIONS

This application claims priority to Provisional Patent Application Ser. No. 62/663,860, entitled "Live Update of GIM", filed Apr. 27, 2018, the entirety of which is incorporated herein by reference.

BACKGROUND

Description of the Related Art

Bug fixes or security patches are periodically applied to a live production kernel module code base. In some computing environments, these patches will cause disruptions to the operating environment. For example, a cloud service provider (CSP) runs various software modules in a live production environment with a fleet of thousands of hosts. It is impractical for a large CSP to kick users off of hosts in order to install an updated version of a kernel device module (i.e., device driver). It is also infeasible to wait until all users are logged off of their own accord.

Additionally, trying to replace a running kernel device module (or module, for short) while a corresponding device is running can be challenging. The act of unloading and reloading the module can create a scenario of lost state. One issue is that the new module will not have any knowledge of the state that the old module left behind. During the period of time after the old module has unloaded and the new module starts loading there will be no driver managing the device. Any activity or change of state to the device will be lost.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing a live update of a kernel device module are disclosed herein. In one implementation, a proxy module is loaded onto a system, with the proxy module providing a registration and communication point for the two different versions of a kernel device module. In one implementation, the proxy module and kernel device modules are loadable kernel modules. The proxy module performs the driver activity that cannot be duplicated or released while having two versions of the loadable kernel modules active at the same time when control is transferred from a first version of the kernel device module to a second version of the kernel device module. In one implementation, the proxy module performs activities which include, but are not limited to, device registration, input-output control (IOCTL) calls, sysfs calls, and other activities.

When a first version of a kernel device module loads it will use an application programming interface (API) exported from the proxy module to register with the proxy module. The proxy module will then register with the operating system (OS) pretending to be the first version of the kernel device module. The proxy module will maintain any required open sysfs attribute files and IOCTL file attributes. When a second version of the kernel device module loads, the second version of the kernel device module will also register with the proxy module. Since the proxy module has already registered with the OS, the proxy module does not need to repeat the registration step. Since each version of the kernel device module registers with the proxy module, the proxy module knows how to find and communicate with each version of the kernel device module. A new version of the kernel device module will query the proxy module to find the other version so that the two versions are able to communicate directly. In one implementation, once the two versions of the kernel device module are able to communicate directly with each other, the two versions manage the transfer of device control between themselves without needing further assistance from the proxy module.

Figure 1:
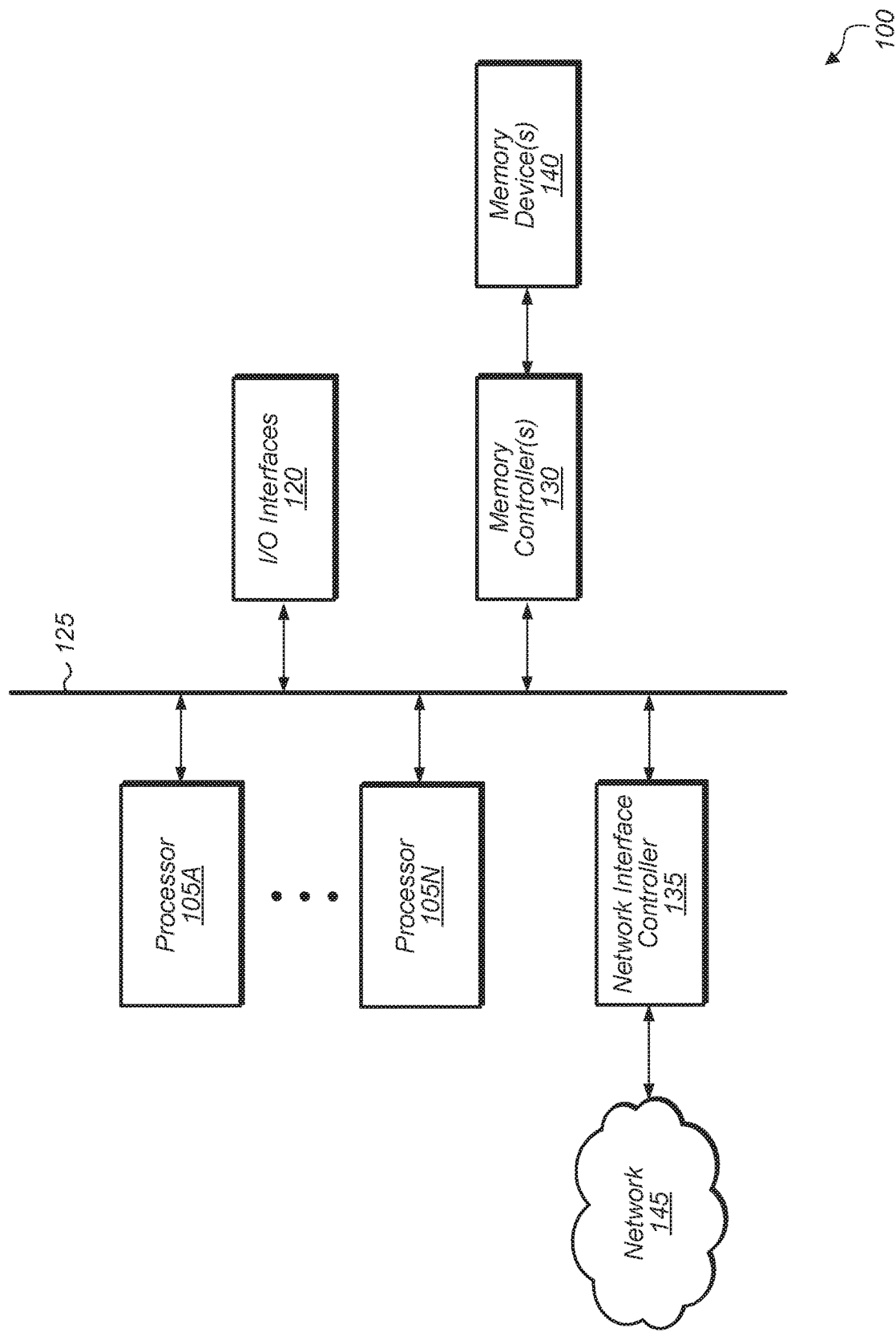
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface controller (NIC) 135, and memory device(s) 140. In other implementations, computing system 100 includes other components and/or computing system 100 is arranged differently. Processors 105A-N are representative of any number of processors which are included in system 100. In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface controller (NIC) 135 receives and sends network messages across network 145.

Network 145 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 145 further includes remote direct memory access (RDMA) hardware and/or software, transmission control protocol/internet protocol (TCP/IP) hardware and/or software, router, repeaters, switches, grids, and/or other components.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
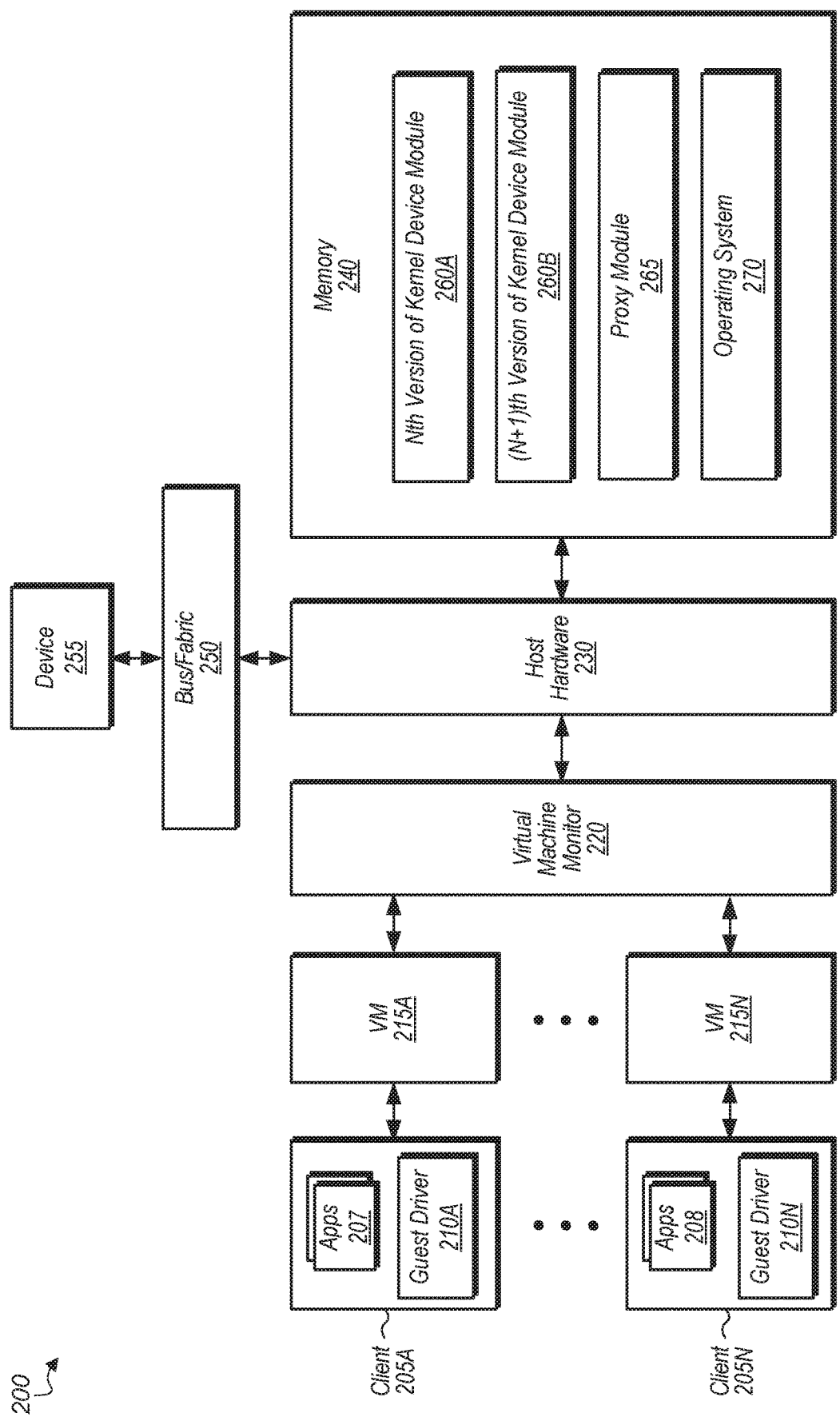
FIG. 2 is a block diagram of one implementation of a virtual environment of a server.

Turning now to FIG. 2, a block diagram of one implementation of a virtual environment of a server 200 is shown. In one implementation, server 200 includes clients 205A-N, virtual machines (VMs) 215A-N, virtual machine monitor (VMM) 220, host hardware 230, memory 240, bus/fabric 250, and device 255. In one implementation, server 200 is part of a cloud service provider environment. It should be understood that server 200 is merely one illustration of a server architecture that is used in one implementation. In other implementations, a server includes other numbers and/or types of components arranged in other suitable manners.

Client 205A-N are representative of any number of clients which are coupled to and/or using resources on server 200. Clients 205A-N include any number and type of applications 207 and 208, respectively. One of the applications within each of the clients 205A-N may be an operating system such as for example Linux® or Microsoft® Windows®. Each client 205A-N can also include a guest driver 210A-N, respectively, to interact with device 255. In one implementation, a virtual machine (VM) 215A-N is instantiated on server 200 for each client 205A-N. In one implementation, VMM 220 schedules the VMs 215A-N and the operating system inside each VM manages the scheduling of applications 207-208 on device 255. Host hardware 230 includes any number and type of processing resources. For example, in one implementation, host hardware 230 includes a plurality of CPUs (e.g., multi-core CPUs). Host hardware 230 also includes memory controller logic, cache subsystem(s), fabric and/or interconnect resources, network interface circuitry, power management circuitry, voltage regulators, and so on. Memory 240 is representative of any number and type of memory devices included within server 200. Bus/fabric 250 includes any type of interconnect logic for connecting the various components of server 200. While a single device 255 is shown connected to bus/fabric 250, it should be understood that multiple other devices are able to be connected to bus/fabric 250. In one implementation, device 255 is a GPU. In other implementations, device 255 is any of various other types of devices. In various implementations, clients 205A-N may include applications which are executed at least in part using the computing resources of device 255. Guest driver 210A-N of clients 205A-N, respectively, which use device 255 are designed to manage the interactions between apps 207 and 208 respectively and the resources of device 255.

To manage interactions between OS 270 and device 255, memory 240 stores Nth version of kernel device module 260A, wherein kernel device module 260A is a device driver for device 255. When Nth version of kernel device module 260A is loaded into memory 240 and installed on server 200, Nth version of kernel device module 260A registers with proxy module 265 rather than registering with operating system (OS) 270. In one implementation, OS 270 is a Linux®-based OS. In other implementations, OS 270 is any of various other types of OS's (e.g., Windows®).

When Nth version of kernel device module 260A is loaded into memory 240 and installed on server 200, Nth version of kernel device module 260A registers with proxy module 265 rather than registering with operating system (OS) 270. The Nth version of kernel device module 260A does not know if a previous version of the device driver is already installed and running on server 200 for device 255. Proxy module 265 returns an indication during the registration process to notify Nth version of kernel device module 260A if it is the first device driver or if a previous version of the device driver is already present. During the lifetime of server 200, it may be desired to update the device driver for device 255 to add new functionality, fix bugs, and/or make other types of changes. However, it is also desired that the updating of the device driver result in minimal interference with the operation of clients 205A-N. (N+1)th version of kernel device module 260B represents a newer version of the device driver for device 255 which is intended to replace Nth version of kernel device driver 260A. For example, in one implementation, (N+1)th version of kernel device module 260B uses one or more different data structures than Nth version of kernel device driver 260A.

When (N+1)th version of kernel device module 260B is loaded into memory 240 and installed on server 200, (N+1)th version of kernel device module 260B registers with proxy module 265 rather than registering with operating system (OS) 270. When (N+1)th version of kernel device module 260B registers with proxy module 265, (N+1)th version of kernel device module 260B does not know if a previous version of the device driver is already installed and running on server 200 for device 255. In the case where a previous version (Nth version) is already running, the proxy module 265 returns an indication during the registration process to notify (N+1)th version of kernel device module 260B that an existing device driver is already running. Proxy module 265 also provides (N+1)th version of kernel device module 260B with a pointer to Nth version of kernel device module 260A. This allows (N+1)th version of kernel device module 260B and Nth version of kernel device module 260A to communicate to manage the transfer of control to (N+1)th version of kernel device module 260B.

In some scenarios, this transfer of control from Nth version of kernel device module 260A to (N+1)th version of kernel device module 260B must occur without clients 205A-N being aware of the transfer. As part of the process of transferring control between modules 260A-B, static data associated with device 255 is copied from Nth version of kernel device module 260A to (N+1)th version of kernel device module 260B. While static data is being copied, Nth version of kernel device module 260A continues to manage device 255 and clients 205A-N continue to run and use device 255 without any interruptions. In one implementation, static data includes a number of VFs, a size of the frame buffer, data from configuration files, video basic input output system (BIOS) image, and/or other data. After the static data is copied, Nth version of kernel device module 260A is quiesced. In one implementation, quiescing Nth version of kernel device module 260A involves stopping all inputs coming into Nth version of kernel device module 260A. However, stopping all inputs coming into Nth version of kernel device module 260A does not necessarily disrupt clients 205A-N. For example, in one implementation, device 255 is a GPU, and a given client 205 might have a render operation running on device 255 when the quiesce operation is initiated. While Nth version of kernel device module 260A is being quiesced, the render operation is able to continue running on device 255 without interruption. Only if the given client 205 is waiting on a response from Nth version of kernel device module 260A will the given client 205 experience a small delay. If external stimuli to the Nth version of the kernel device module 260A occur during the time while the Nth version is quiesced and the (N+1)th version of kernel device module 260B has not yet started there may be a possible small delay to the system. After Nth version of kernel device module 260A is quiesced, transient data associated with device 255 is transferred from Nth version of kernel device module 260A to (N+1)th version of kernel device module 260B. Then (N+1)th version of kernel device module 260B takes over as the new device driver for device 255. Clients 205A-N will be unaware of this change in the device driver for device 255.

Figure 3:
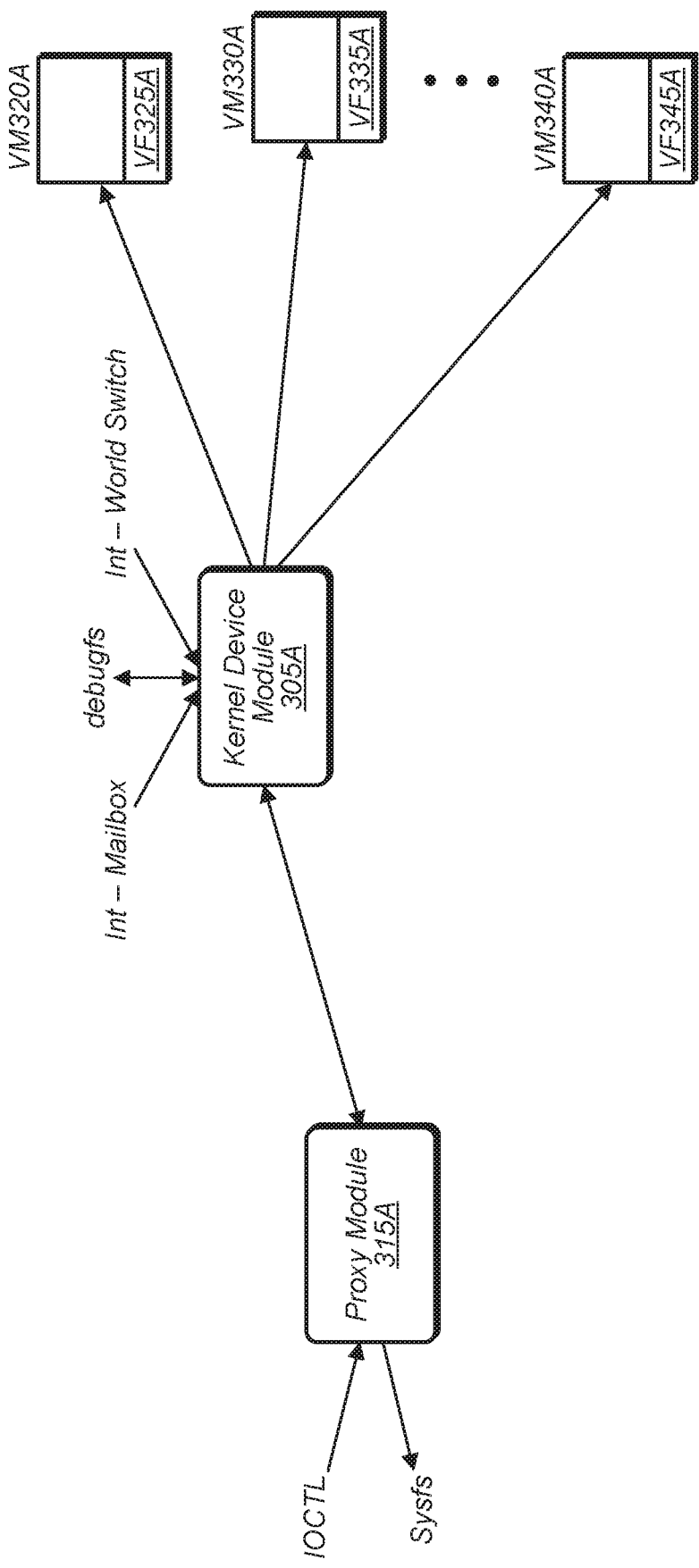
FIG. 3 illustrates a block diagram of one implementation of a computing system.

Referring now to FIG. 3, a block diagram of one implementation of a computing system 300 is shown. In one implementation, a kernel device module 305A registers with a proxy module 315A to operate as a device driver for a given device (not shown). In one implementation, the given device is a GPU. In other implementations, the given device is any of various other types of devices. It is noted that the terms "kernel device module" and "device driver" are used interchangeably herein.

VMs 320A, 330A, and 340A are representative of any number of VMs which are utilizing the processing resources of the given device. VMs 320A, 330A, and 340A correspond to virtual functions (VFs) 325A, 335A, and 345A, respectively, which take turns running on the given device. In another implementation, various clients which are not VFs could take turns running on the given device. After kernel device module 305A registers with proxy module 315A, proxy module 315A registers with the operating system (OS) (not shown) pretending to be kernel device module 305A. In other words, proxy module 315A identifies itself as kernel device module 305A to the OS so as to register kernel device module 305A as the device driver for the given device. Then, after proxy module 315A registers with the OS for kernel device module 305A, kernel device module 305A is able to start managing the given device. In one implementation, managing the given device involves processing IOCTL and sysfs calls, processing interrupts (e.g., Mailbox interrupts, World Switch interrupts), and processing debug requests. In other implementations, managing the given device involves other types of actions.

Figure 4:
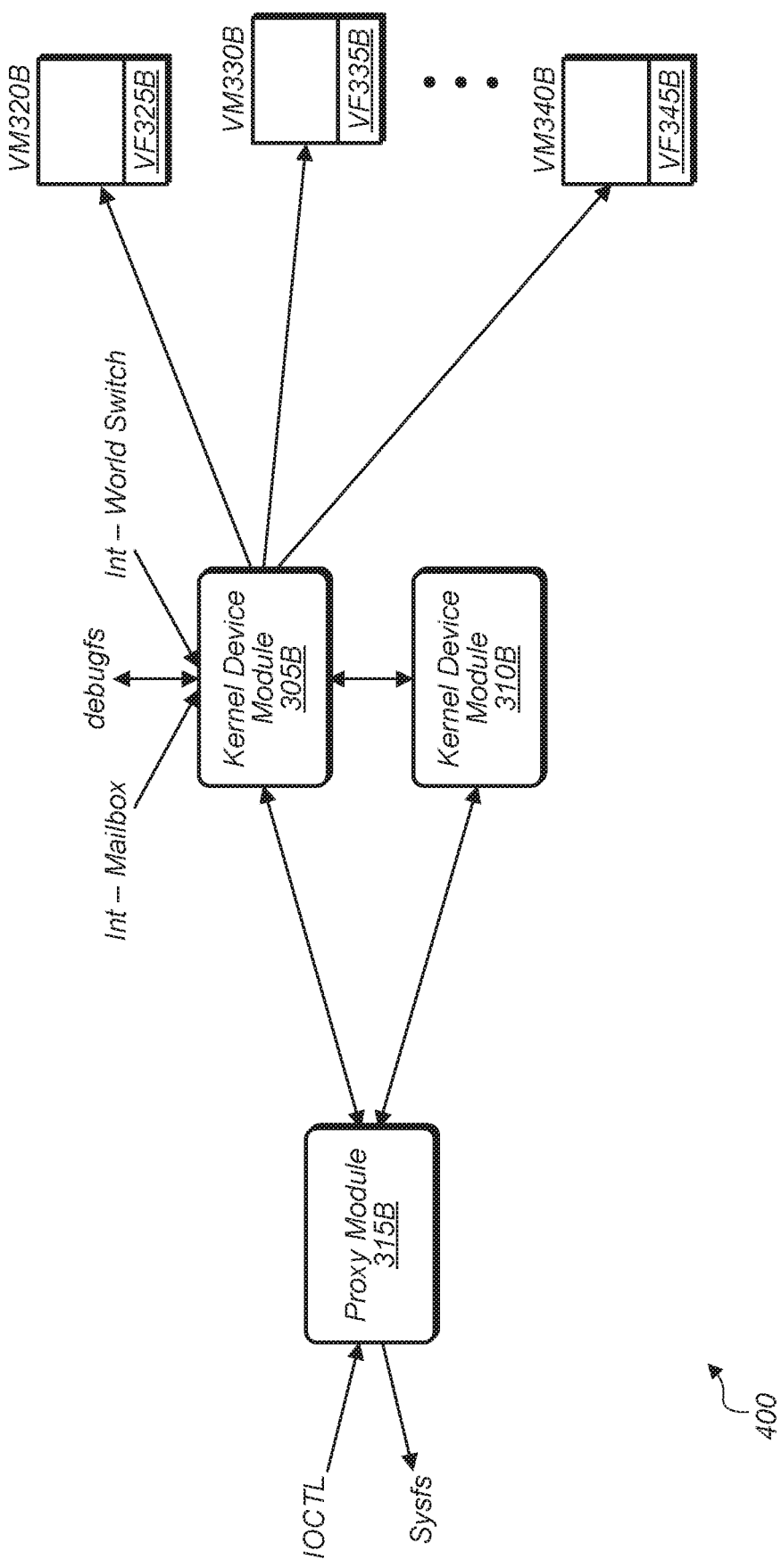
FIG. 4 illustrates a block diagram of one implementation of a computing system.

Turning now to FIG. 4, a block diagram of one implementation of a computing system 400 is shown. Computing system 400 is intended to represent computing system 300 (of FIG. 3) at a later point in time. Accordingly, kernel device module 305B and proxy module 315B are intended to represent kernel device module 305A and proxy module 315A, respectively, at the later point in time. At the point in time illustrated in FIG. 4, kernel device module 310B has been loaded onto system 400. Being loaded onto system 400 means that kernel device module 310B has been stored in the memory of system 400 and that execution of kernel device module 310B has been initiated on one or more processors of system 400.

For the purposes of this discussion, it is assumed that kernel device module 310B is a subsequent version of kernel device module 305B. For example, if kernel device module 305B is the first version of a device driver, then kernel device module 310B is the second or later (or earlier in the case of downgrading) version of the device driver. It is common for device drivers to be updated from time to time to incorporate new functionality, fix bugs, provide security updates, and/or implement other changes. Therefore, it is expected that the original device driver for a given device will not be the only device driver for the given device during the entire lifetime of system 400. Accordingly, updates to kernel device module 305B will be loaded onto system 400 at various times. Kernel device module 310B is intended to represent a complete replacement of kernel device module 305B. When performing a complete replacement of kernel device module 305B, the handoff of control from kernel device module 305B to kernel device module 310B should not disrupt VMs 320B, 330B, and 340B. Or, put another way, it is desired to minimize the disruption to VMs 320B, 330B, and 340B during the transfer of control from kernel device module 305B to kernel device module 310B. As shown in FIG. 4, VMs 320B, 330B, and 340B correspond to VFs 325B, 335B, and 345B, respectively, which take turns running on the given device. In another implementation, various clients which are not VFs could be running on the given device.

As used herein, the term "kernel device module" is defined as a device driver which handles the interface between a given device of system 400 and the OS or other software applications of system 400. In one implementation, the given device is a GPU. In other implementations, the given device is any of various other types of devices. It is assumed for the purposes of this discussion that kernel device module 310B and kernel device module 310A are both designed for interfacing to the same device of system 400. Therefore, if both kernel device module 310B and kernel device module 310A were to simultaneously attempt to handle the interface to the same given device, this would result in unpredictable behavior for system 400. Accordingly, kernel device module 305B and kernel device module 310B will coordinate access to the given device to manage the hand-off of control.

When kernel device module 310B is loaded onto system 400, kernel device module 310B registers with proxy module 315B rather than registering with the OS. The OS already has an existing driver registration with the given device, and so the OS will not allow kernel device module 310B to be registered with the same driver name for this given device. The existing registration was performed by proxy module 315B on behalf of kernel device module 305B. Accordingly, since kernel device module 310B is not able to register with OS to be the device driver for the given device, kernel device module 310B registers with proxy module 315B. In response to receiving this registration attempt, proxy module 315B will notify kernel device module 310B that another kernel device module (i.e., kernel device module 305B) is already registered to be the device driver for the given device. Proxy module 315B also provides kernel device module 310B with a pointer which allows kernel device module 310B to communication with kernel device module 305B.

In this implementation, kernel device module 310B uses the pointer to communicate with kernel device module 305B to facilitate the transfer of control of the given device. As a first step, kernel device module 310B requests any static data associated with the given device. In response to this request, kernel device module 305B sends the static data associated with the given device to kernel device module 310B. In one implementation, static data includes a number of VFs, a size of the frame buffer, data from configuration files, video basic input output system (BIOS) image, and/or other data. While these events are occurring, kernel device module 305B continues to act as the device driver for the given device. By continuing to act as the device driver for the given device, kernel device module 305B continues to process IOCTL and sysfs calls for the given device. Kernel device module 305B also continues to process mailbox interrupts, world switch interrupts, and debug signals for the given device.

Figure 5:
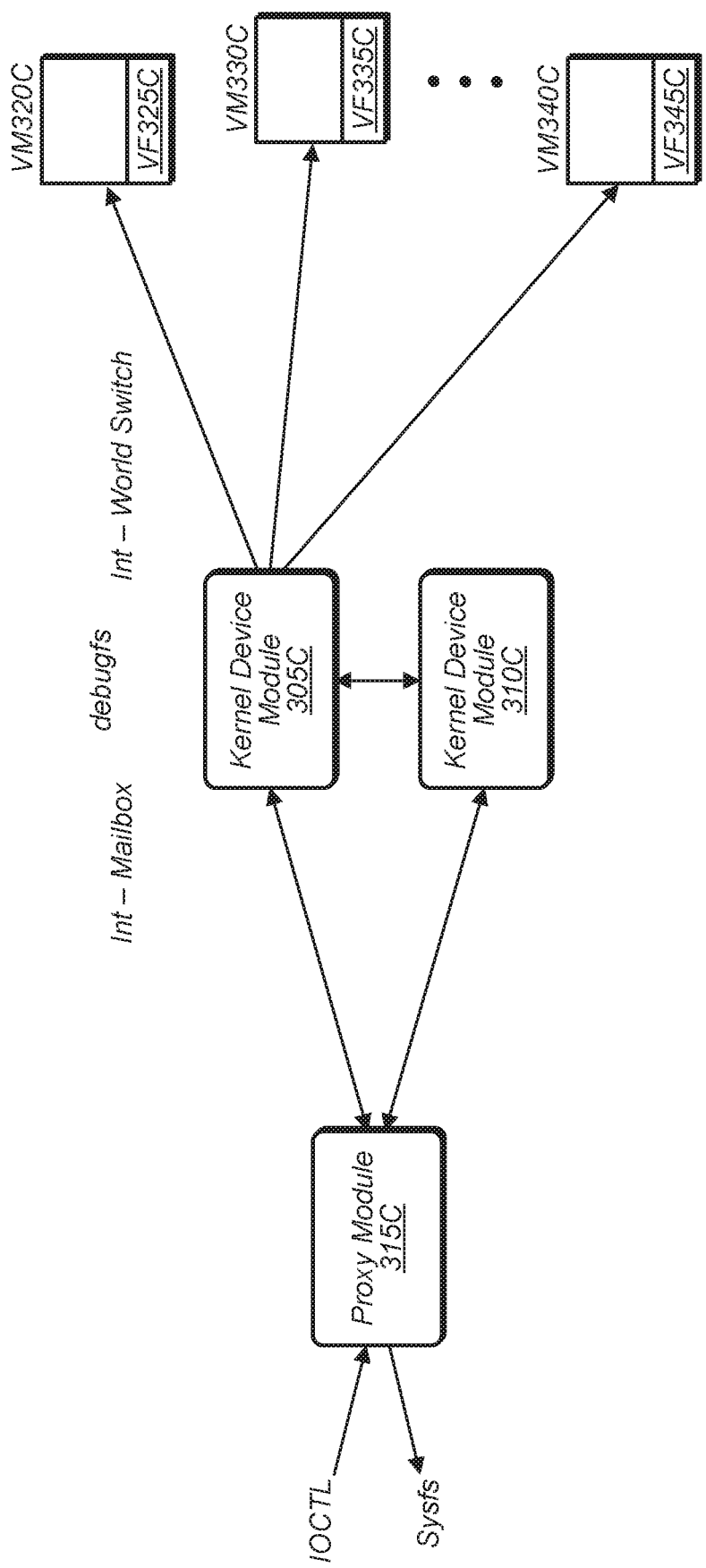
FIG. 5 illustrates a block diagram of one implementation of a computing system.

Referring now to FIG. 5, a block diagram of one implementation of a computing system 500 is shown. FIG. 5 represents a continuation of the discussion of FIG. 4. In other words, computing system 500 is intended to represent computing system 400 at a later point in time. Accordingly, kernel device module 305C, kernel device module 310C, and proxy module 315C are intended to represent kernel device module 305B, kernel device module 310B, and proxy module 315B (of FIG. 4), respectively, at the later point in time. VMs 320C, 330C, and 340C and VFs 325C, 335C, and 345C also represent VMs 320B, 330B, and 340B and VFs 325B, 335B, and 345B (of FIG. 4), respectively, at the later point in time.

At the point in time illustrated in FIG. 5, the processing of mailbox interrupts, world switch interrupts, and debug signals by kernel device module 305C has been paused. Any interrupts or debug signals that are generated during this time for the given device that are destined for the kernel device module 305C will be queued. However, kernel device module 305C will continue to process IOCTL and sysfs calls at this point in time. In this implementation if one of the VMs 320B, 330B or 340B happens to be utilizing the given device they may continue to do so. Any interrupts or operations destined for the VMs may continue to be processed unhindered. Kernel device module 305C and kernel device module 310C will communicate with each other to coordinate the timing of the pausing of the processing of the interrupts and debug signals and the quiescing of kernel device module 305C. Once kernel device module 305C has been quiesced, kernel device module 305C sends transient data to kernel device module 310C. In one implementation, transient data includes the currently running VF, the state of the currently running VF, the order of VFs on the run list, event buckets, accumulated data, and/or other data. During the period of time where the kernel device module 305C has been quiesced any interrupts or operations destined for the VMs may continue to be processed unhindered.

Figure 6:
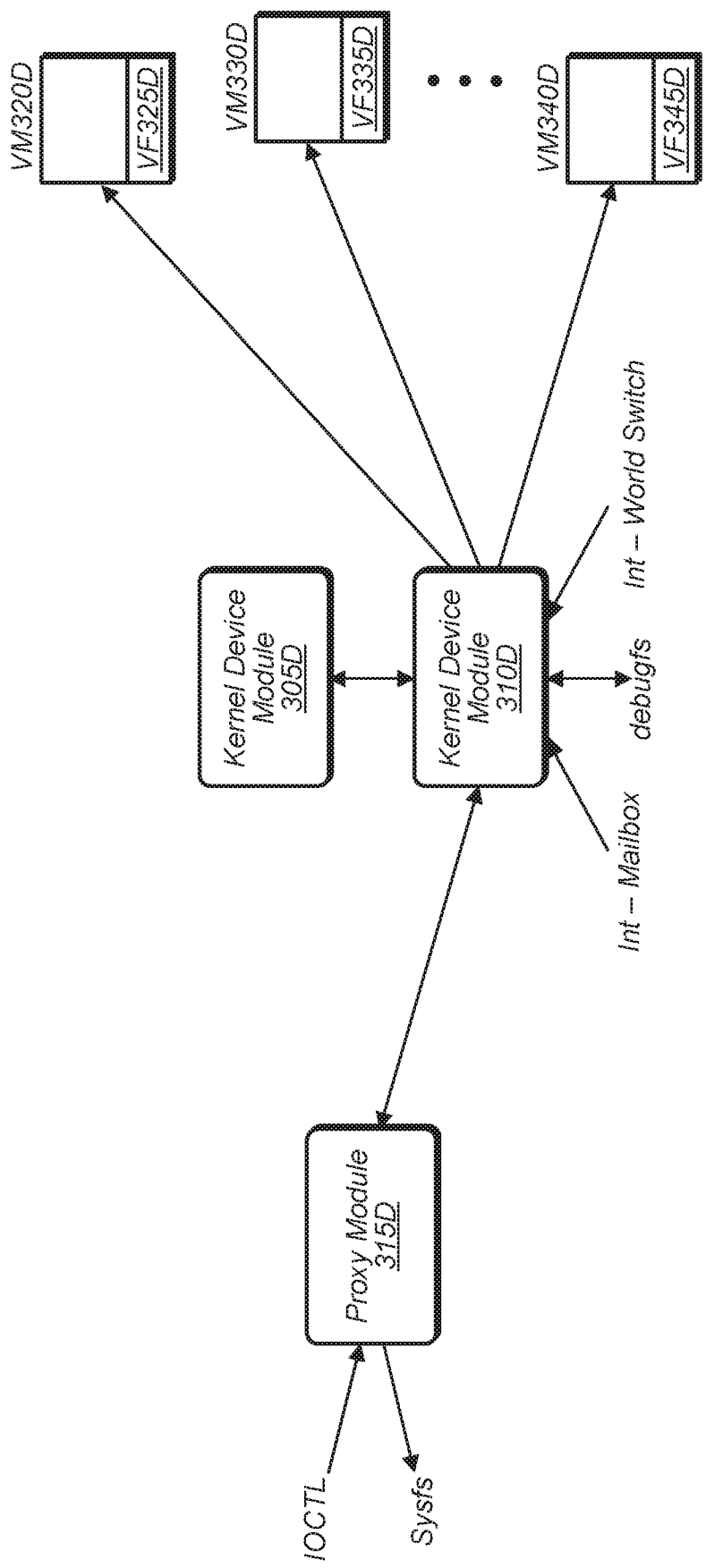
FIG. 6 illustrates a block diagram of one implementation of a computing system.

Turning now to FIG. 6, a block diagram of one implementation of a computing system 600 is shown. Computing system 600 is intended to represent computing system 500 at a later point in time. Accordingly, kernel device module 305D, kernel device module 310D, and proxy module 315D are intended to represent kernel device module 305C, kernel device module 310C, and proxy module 315C, respectively, at the later point in time. Also, VMs 320D, 330D, and 340D as well as VFs 325D, 335D, and VF 345D represent VMs 320C, 330C, and 340C and VFs 325C, 335C, and VF 345C, respectively, at the later point in time.

At the point in time illustrated in FIG. 6, the processing of mailbox interrupts, world switch interrupts, and debug signals has been restarted by kernel device module 310D. Any interrupts or debug signals that were generated during the time between when kernel device 305D stopped processing interrupts and debug signals and kernel device 310D started handling the processing of interrupts and debug signals will be processed out of the corresponding queues or status registers where they were recorded. Additionally, at the point in time represented by FIG. 6, kernel device module 310D will start to process IOCTL and sysfs calls. Kernel device module 310D and kernel device module 305D communicate with each other to coordinate the transfer of control for handling the processing of IOCTL and sysfs calls.

Figure 7:
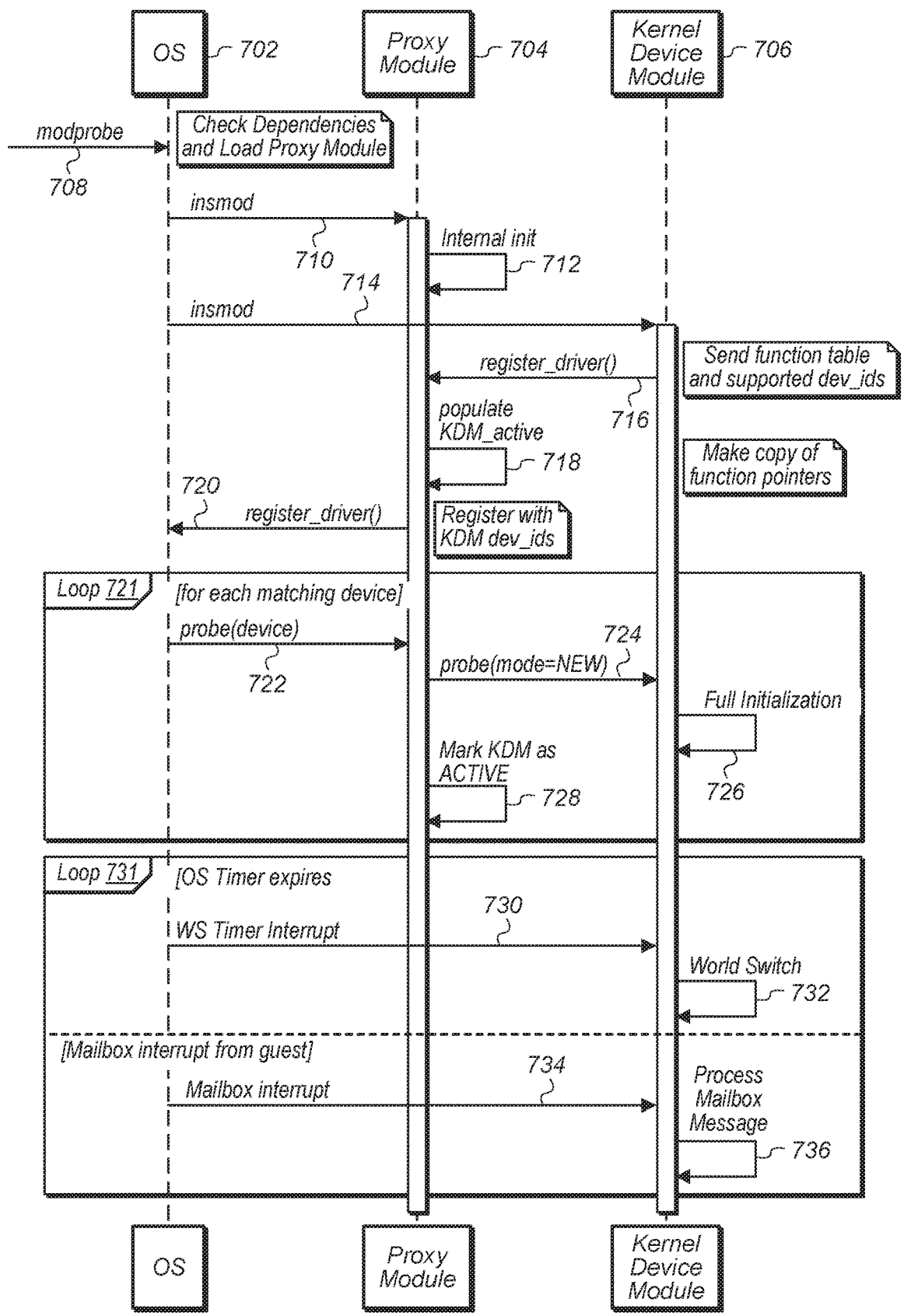
FIG. 7 illustrates a sequence diagram of one implementation of the interaction between the OS, proxy module, and kernel device module.

Referring now to FIG. 7, a sequence diagram of one implementation of the interaction between an OS, proxy module, and kernel device module is shown. In one implementation, when a modprobe call is made for kernel device module 706, OS 702 resolves the dependencies of kernel device module 706. Depending on the implementation, modprobe is executed manually or modprobe is automated as part of a startup script. When OS 702 determines that kernel device module 706 is dependent upon proxy module 704, OS 702 will load and initialize proxy module 704 in step 710. Proxy module 704 performs internal initialization in step 712 in preparation for kernel device module 706 to be loaded in step 714. Then, after kernel device module 706 is loaded in step 714, kernel device module 706 calls the function "register_driver" in step 716 to register with proxy module 704. It is assumed for the purposes of this discussion that kernel device module 706 is the initial device driver to be loaded for a particular device of the system. Accordingly, since kernel device module 706 is the initial device driver to be loaded for the particular device, proxy module 704 marks its internal tables associated with this instance of kernel device module 706 as ACTIVE in step 718, and a first time initialization of the hardware is performed for the particular device.

Rather than registering as a device driver with OS 702, kernel device module 706 will register as a device driver with proxy module 704. Proxy module 704 will act as a surrogate OS for kernel device module 706. The bus (e.g., peripheral component interconnect (PCI)) device identifiers (IDs) are transparent to proxy module 704. Proxy module 704 obtains the device IDs from kernel device module 706. This adds an additional level of independence between versions of proxy module 704 and versions of kernel device module 706. Proxy module 704 will register its own driver with OS 702 on behalf of kernel device module 706 using the device IDs provided by kernel device module 706. Kernel device module 706 passes proxy module 704 a table of function pointers that proxy module 704 will use as callbacks into kernel device module 706. For security purposes, proxy module 704 makes a copy of the function pointer table. This prevents kernel device module 706 from changing the table either maliciously on purpose or by accident (e.g., due to a bug).

In loop 721, OS 702 searches for devices that match a given device ID and calls the .probe function of proxy module 704 for each matching device ID in step 722. OS 702 will do this for all devices that match with the device IDs in the device ID table of kernel device module 706. Upon receiving a call to the .probe function, proxy module 704 will not perform any hardware device initialization. Rather, the device initialization will be performed by kernel device module 706. Proxy module 704 will call the .probe callback function for each matching device ID of kernel device module 706. In one implementation, proxy module 704 calls the .probe function of kernel device module 706 with an extra parameter that is in addition to the OS parameters. This extra parameter indicates whether the load is an initial load of the driver or a replacement of a previous driver. For the implementation shown in sequence diagram 700, proxy module 704 will use the extra parameter to notify kernel device module 706 that this is an initial load of the driver. In response to receiving the notification that this is an initial load of the driver, kernel device module 706 will perform a full hardware initialization.

Once all of the devices have been probed and initialized, kernel device module 706 will enter its normal runtime mode. During runtime, examples of stimuli that can affect the state of the device and kernel device module 706 may include a Mailbox interrupt, World Switch Timer interrupt, and notifications from the hardware emulator. A guest driver in the guest OS will use the Mailbox interrupt to generate a notification for kernel device module 706. When kernel device module 706 receives a Mailbox interrupt, kernel device module 706 will schedule a work item on the Mailbox work queue for later processing. When OS 702 is available, OS 702 will execute the work on the work queue. In one implementation, kernel device module 706 processes world switch timer interrupts on a programmable interval. In one implementation, the programmable interval is in a range of 3 milliseconds (ms) to 5 ms. At every interval, kernel device module will schedule a world switch request in the world switch work queue.

In various implementations, the hardware emulator and kernel device module 706 communicate to each other through IOCTL calls (hardware emulator→kernel device module 706) and sysfs calls (kernel device module 706→hardware emulator). In one implementation, the hardware emulator is a quick emulator (QEMU). When the hardware emulator needs kernel device module 706 to process some work, the hardware emulator will open the IOCTL attribute, send the request, and then close the attribute. When kernel device module 706 returns from the IOCTL call the work has been completed. The work is done directly in kernel device module 706 in response to the call on the thread of the caller. There is no work queue involved as in the case of world switching and mailbox interrupts. When kernel device module 706 has work for the hardware emulator to do, kernel device module 706 will place a command in a buffer and signal an attribute that the hardware emulator instance is waiting on. The hardware emulator will read the buffer and respond with an IOCTL call when the hardware emulator has finished the work.

Kernel device module 706 will remain in loop 731 detecting and processing the stimuli until kernel device module 706 is either replaced or unloaded. In one implementation, during the normal runtime of kernel device module 706, kernel device module 706 runs independently of proxy module 704. In other words, in this implementation, proxy module 704 is not involved with the single-root input/output virtualization (SRIOV) operations of the device. In one implementation, proxy module 704 is responsible for the updating or replacing of kernel device module 706. In this implementation, proxy module 704 is activated if either kernel device module 706 tries to unload from the system or if a newer kernel device module tries to replace kernel device module 706.

Figure 8:
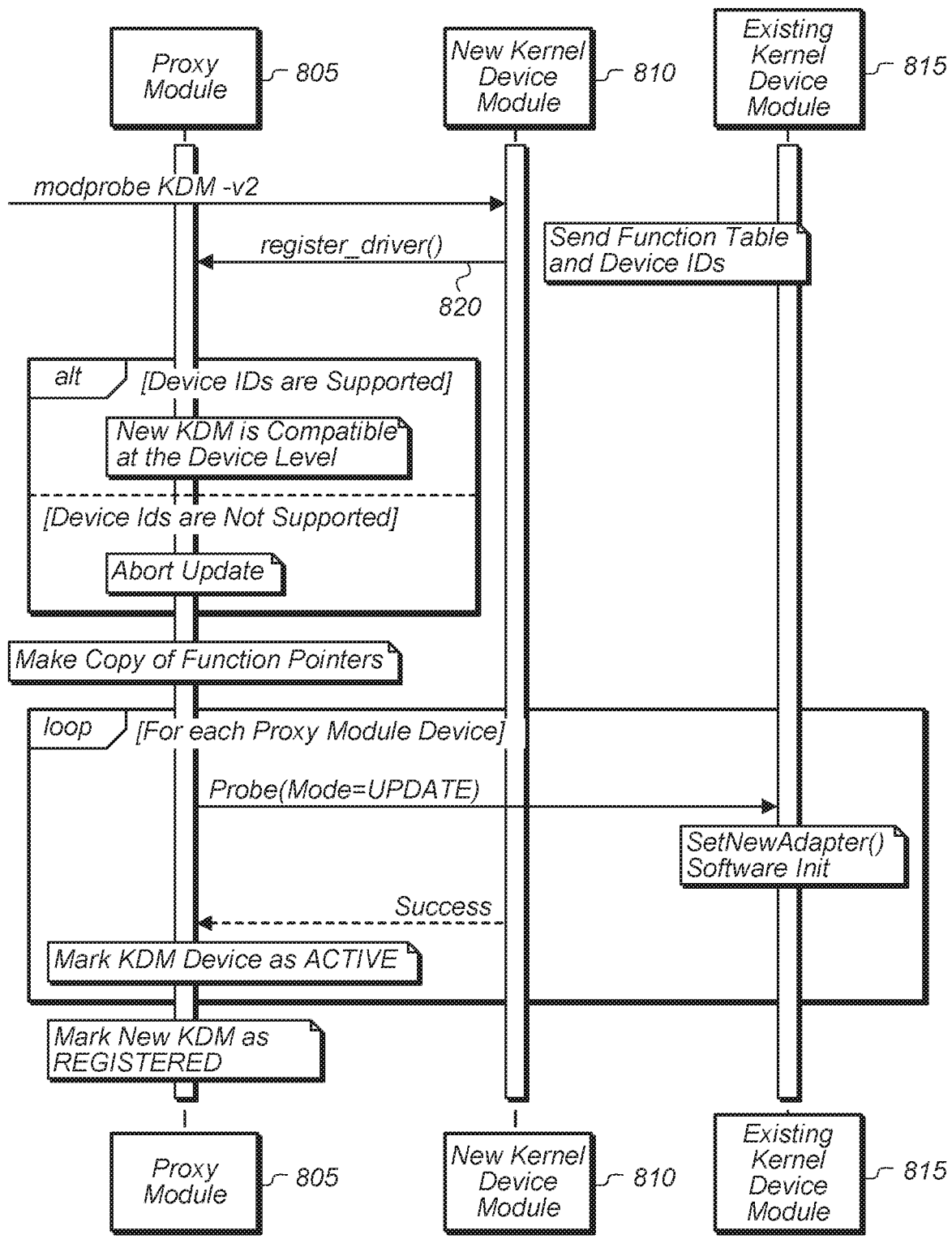
FIG. 8 illustrates a sequence diagram of one implementation of the interactions when loading a new kernel device module.

Turning now to FIG. 8, a sequence diagram of one implementation of the interactions when loading a new kernel device module 810 is shown. When a new kernel device module 810 is loaded onto the system, the new kernel device module 810 will register with proxy module 805 rather than registering with the OS. The new kernel device module version 810 has no knowledge that there is already an existing kernel device module 815 running. The new kernel device module version 810 will attempt to register with proxy module 805 the same way in which the existing kernel device module version 815 registered with proxy module 805 by calling a register_driver( ) given function to register with proxy module 805. The new kernel device module version 810 passes in both a table of function pointers and a table of device IDs to proxy module 805 in step 820.

In one implementation, loading of the new kernel device module 810 will trigger a live kernel device module update process, and no further user interaction is required. In one implementation, the existing kernel device module version 815 is removed on success or the new kernel device module version 810 is removed if an error is detected. One goal of the live kernel device module version update is to be able to update the kernel device module executable code without interrupting running client sessions. This includes both forward and backward updating of the code. In order to be able to do a complete update, it is desired that all of the live client sessions that are in existence before the update will also be active after the update. If the new kernel device module 810 supports the same devices that the existing kernel device module 815 supports, then new kernel device module 810 is registered as the new device driver for these devices. Alternatively, if the new kernel device module 810 cannot support the same devices that the existing kernel device module 815 supports, then the update is aborted with an error explanation logged.

Figure 9:
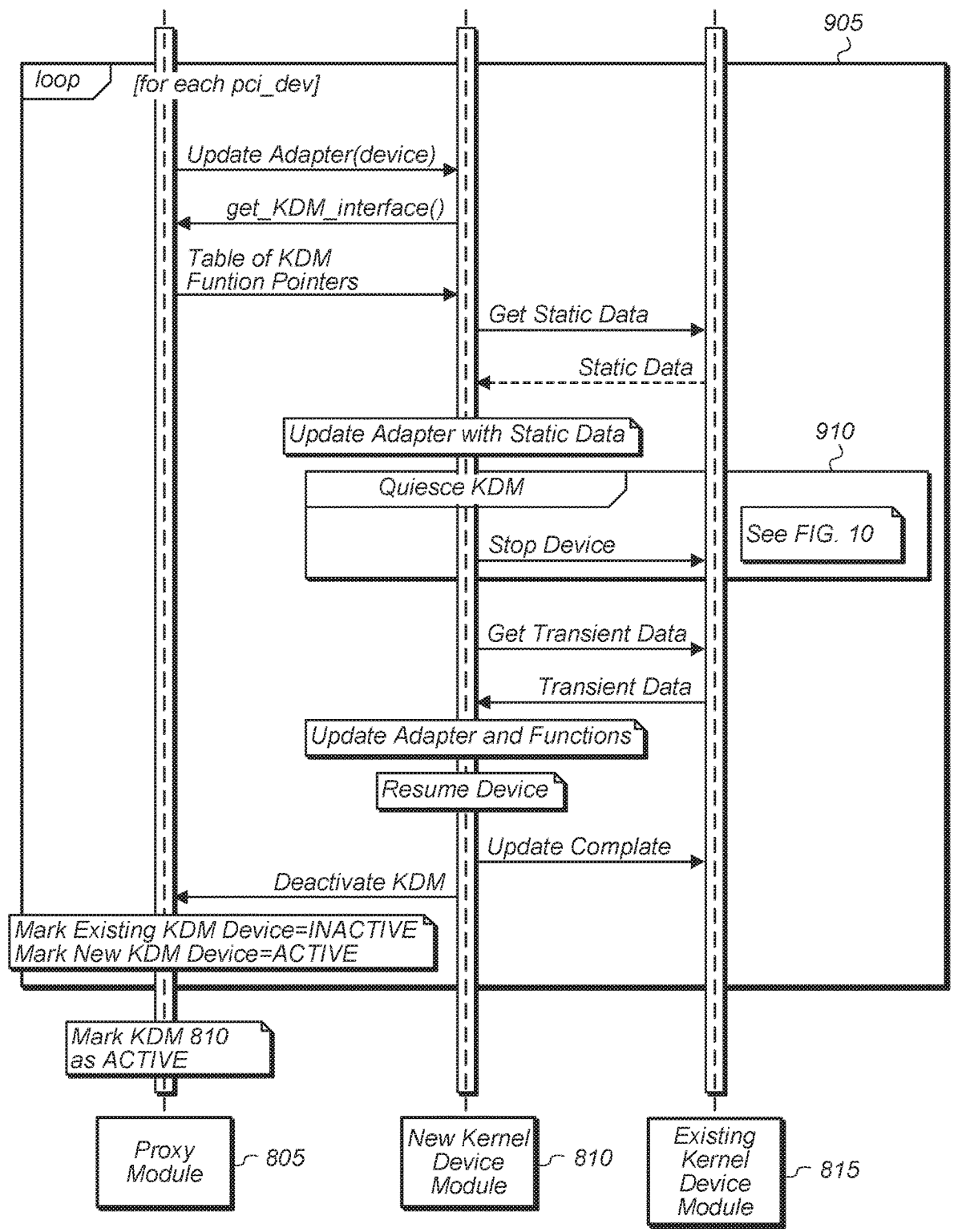
FIG. 9 illustrates a sequence diagram of one implementation of the interactions when loading a new kernel device module.

Referring now to FIG. 9, a sequence diagram of one implementation of the interactions when loading a new kernel device module 810 is shown. FIG. 9 is intended to be a continuation of the discussion of FIG. 8. When transferring control of the device from existing kernel device module 815 to new kernel device module 810, the static data is sent from existing kernel device module 815 to new kernel device module 810. After the static data is transferred, existing kernel device module 815 is quiesced in order to transfer the transient data from existing kernel device module 815 to new kernel device module 810.

In one implementation, in order to transfer sensitive transient data while transitioning to a new device driver, the state of the device should be stable. In this implementation, the device can still be running, but its state as known by the kernel device module cannot change. In one implementation, the stimuli that can change the state of the software and/or device are identified. In one implementation, these stimuli include Mailbox interrupts, World Switch interrupts, and notifications from the hardware emulator. In other implementations, other stimuli are identified and stopped to prevent the device's state from changing. Existing kernel device module 815 is quiesced in box 910 by stopping these identified stimuli to prevent any state change from occurring during the transfer of sensitive transient data.

Figure 10:
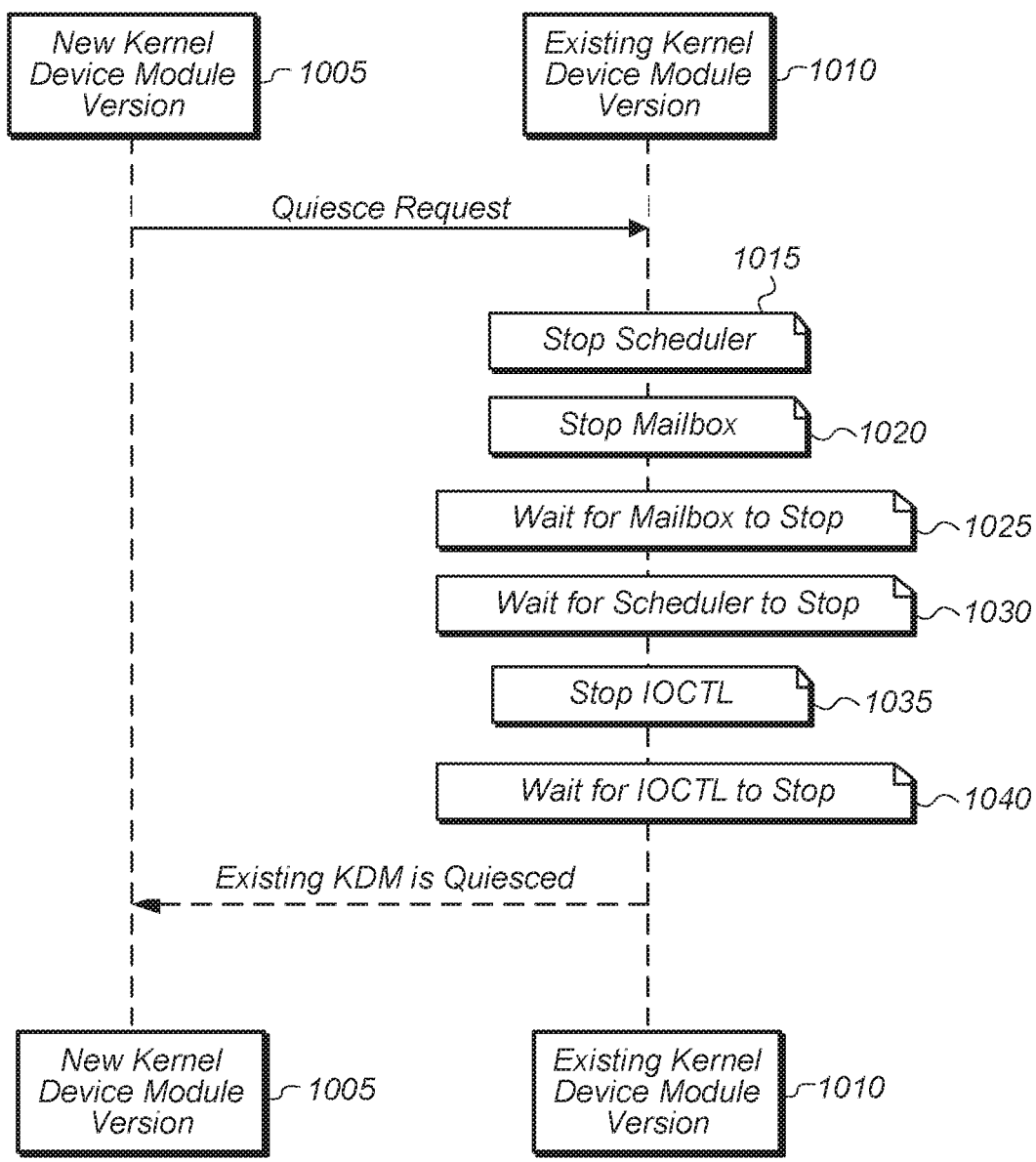
FIG. 10 illustrates a sequence diagram of one implementation of quiescing an existing kernel device module version.

Turning now to FIG. 10, a sequence diagram of one implementation of quiescing an existing kernel device module version 1010 is shown. It is assumed for the purposes of this discussion that new kernel device module version 1005 is taking over as the device driver for a given device by replacing existing kernel device module version 1010. In one implementation, the given device is a GPU while in other implementations, the given device is any of various other devices (e.g., network controller, storage device). In order for existing kernel device module version 1010 to be replaced, existing kernel device module version 1010 will be quiesced. In one implementation, the quiescing of existing kernel device module version 1010 is initiated by new kernel device module version 1005, but it is existing kernel device module version 1010 that performs the various actions to reach a quiesced state. In one implementation, existing kernel device module version 1010 is quiesced by stopping a plurality of threads which are executing on the host computing system. In one implementation, threads that are stopped include scheduler, mailbox, and IOCTL threads. In one implementation, each thread has an associated flag (per adapter) that will indicate whether or not the thread can accept new work.

In one implementation, the first thread to be stopped is the scheduler thread in step 1015. Setting the flag for the scheduler thread will indicate to the world switch scheduler in the kernel device module that the scheduler thread can no longer start new scheduler requests (i.e., prevent further world switches from occurring). The scheduler thread is stopped first since the mailbox thread may attempt to spawn requests to restart the scheduler. Note that the scheduler thread is still able to continue to process an inflight request, but the scheduler thread cannot start a new request once the scheduler thread has been stopped. If a call is made to restart the scheduler thread, this call will be ignored.

In one implementation, the scheduler thread is stopped in step 1015 before stopping the mailbox thread in step 1020. When a guest driver is holding Exclusive Access Mode, the guest driver will also be holding the world switch mutex. The world switch mutex prevents world switching to any other virtual function (VF). The world switch mutex will be released when either the guest driver releases Exclusive Mode (via a Mailbox message) or times out. The Mailbox thread will give priority to requests to release Exclusive Mode over requests to grant Exclusive mode. If the Mailbox thread is actively running and there is a request to release Exclusive Mode, then this request will be inflight. The Mailbox thread is allowed to finish the release of Exclusive Mode before waiting for the scheduler thread to stop. Note that if Exclusive Mode is held and there is not a pending release of Exclusive Mode on the work queue, the scheduler thread can be stopped and the mutex state will be transferred to the kernel device module version 1005 during the transfer of transient state. In other words, the live update does not need to wait until Exclusive Mode is completed before completing the live update.

The mailbox thread is stopped in step 1020 to prevent the mailbox thread from accepting any new work. New work for the mailbox thread originates with the guest driver issuing requests to either enter or exit Exclusive Mode. In one implementation, rather than stopping the guest driver, mailbox interrupts are disabled. The guest driver can still try to trigger a Mailbox interrupt, but the Mailbox interrupt will not get processed. The interrupt request will be saved in the Mailbox status register and can be polled later to determine if there any work requests were generated while interrupts were disabled. The request to stop the Mailbox thread in step 1020 can occur while the Mailbox thread is processing a work item. There can also be work items queued for the Mailbox thread. Setting the flag does not indicate that the Mailbox thread will be idle. The next step is to wait for the Mailbox thread to stop in step 1025

After requesting to stop the Mailbox thread in step 1020, an inflight work item will be processed to completion, but a new work item will not be started. Any work items on the queue will be transferred to the new kernel device module version 1005 for processing during the transfer of transient data. In one implementation, existing kernel device module version 1010 waits for the Mailbox thread to stop at step 1025 and the scheduler thread to stop before stopping the IOCTL thread in step 1035. Typically, a Mailbox work item will also require a response from the VMM. In order to receive the response and not deadlock, the IOCTL thread is permitted to continue running until the Mailbox thread has stopped in step 1025. After requesting for the IOCTL thread to stop in step 1035, existing kernel device module version 1010 waits for the IOCTL thread to stop in step 1040. Existing kernel device module version 1010 waits until any outstanding work has been completed before returning a successful response to new kernel device module version 1005. When any outstanding work has been completed, transient data is transferred from existing kernel device module version 1010 to new kernel device module version 1005 and then control of the device is passed to new kernel device module version 1005.

Figure 11:
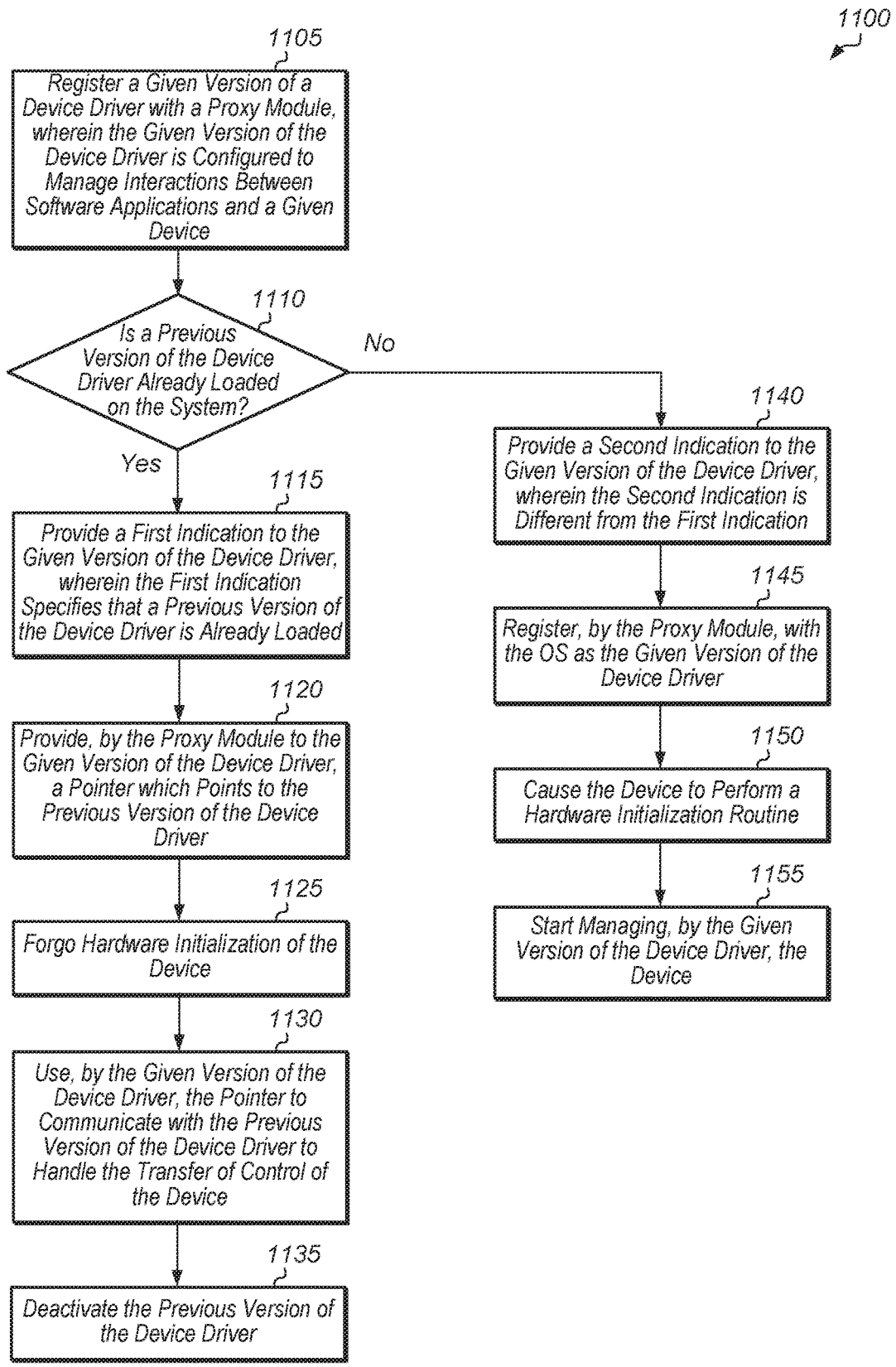
FIG. 11 is a generalized flow diagram illustrating one implementation of a method for loading a kernel device module.
Figure 12:
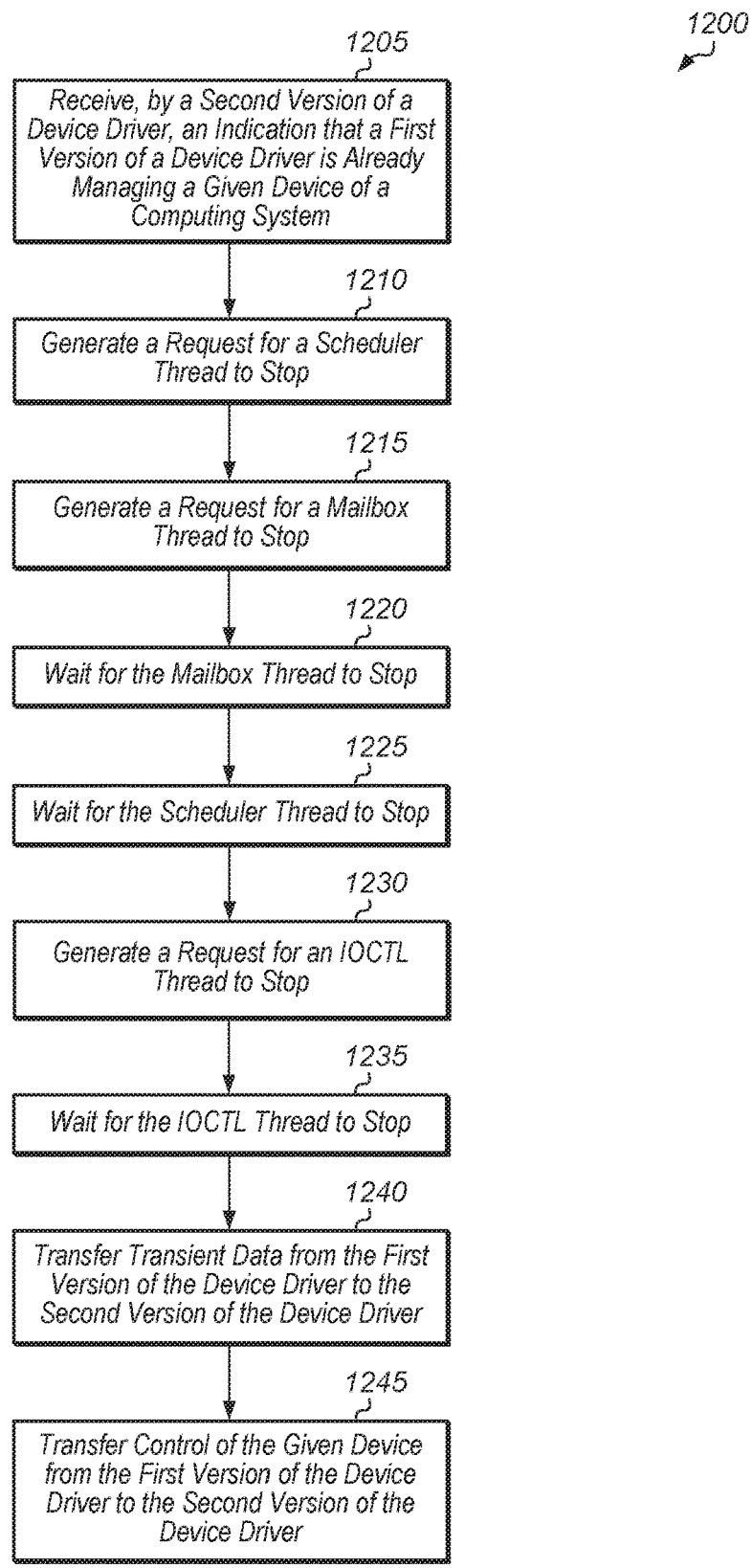
FIG. 12 is a generalized flow diagram illustrating one implementation of a method for quiescing a first version of a device driver in order to transfer control of the device from the first version of the device driver to a second version of the device driver.

Turning now to FIG. 11, one implementation of a method 1100 for loading a kernel device module is shown. For purposes of discussion, the steps in this implementation and those of FIG. 12 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1100.

A given version of a device driver registers with a proxy module, wherein the given version of the device driver is configured to manage interactions between software applications and a given device (block 1105). In one implementation, the device is a GPU. In other implementations, the device is any of various other types of processing or peripheral devices. Next, the proxy module determines if a previous version of the device driver is already loaded and executing on the system for the given device (conditional block 1110). If a previous version of the device driver is already loaded and executing on the system (conditional block 1110, "yes" leg), then the proxy module provides a first indication to the given version of the device driver, wherein the first indication specifies that a previous version of the device driver is already loaded (block 1115). The proxy module also provides, to the given version of the device driver, a pointer which points to the previous version of the device driver (block 1120). The given version of the device driver forgoes hardware initialization of the device responsive to receiving the first indication (block 1125). The given version of the device driver uses the pointer to communicate with the previous version of the device driver to handle the transfer of control of the device from the previous version of the device driver to the given version of the device driver (block 1130). After control of the device has been transferred from the previous version of the device driver to the given version of the device driver, the previous version of the device driver is deactivated (block 1135). After block 1135, method 1100 ends.

If a previous version of the device driver is not already loaded and executing on the system (conditional block 1110, "no" leg), then the proxy module provides a second indication to the given version of the device driver, wherein the second indication is different from the first indication (block 1140). Also, the proxy module registers with the OS as the given version of the device driver (block 1145). In other words, the proxy module emulates the given version of the device driver to the OS. Also in response to receiving the second indication, the given version of the device driver causes the device to perform a hardware initialization routine (block 1150). Also in response to receiving the second indication, the given version of the device driver starts managing the device (block 1155). After block 1155, method 1100 ends. It is noted that in various implementations, method 1100 is performed for each new version of the device driver which is installed on the system.

Referring now to FIG. 12, one implementation of a method 1200 for quiescing a first version of a device driver in order to transfer control of the device from the first version of the device driver to a second version of the device driver is shown. A second version of a device driver receives an indication that a first version of a device driver is already managing a given device of a computing system (block 1205). In one implementation, the second version of the device driver receives the indication in response to registering with a proxy module. In response to receiving the indication, a request to stop a scheduler thread is generated (block 1210). In one implementation, the scheduler thread is stopped by setting a corresponding flag, which indicates to a guest driver that the scheduler thread can no longer start new scheduler requests. Next, a request to stop a mailbox thread is generated (block 1215). The request to stop the mailbox thread is generated in block 1215 to prevent the mailbox thread from accepting any new work. Then, the first version of the device driver waits for the mailbox thread to stop (block 1220). Next, the first version of the device driver waits for the scheduler thread to stop (block 1225). Then, a request is generated to stop an IOCTL thread (block 1230). Next, the system waits for the IOCTL thread to stop (block 1235). Then, transient data is transferred from the first version of the device driver to the second version of the device driver (block 1240). Next, control of the device is transferred from the first version of the device driver to the second version of the device driver (block 1245). After block 1245, method 1200 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory storing program instructions of an operating system (OS), a proxy module, and a first version of a device driver configured to manage interactions between one or more software applications and a device; and
a processor configured to:
register the first version of the device driver with the proxy module; and
execute program instructions of the proxy module to:
provide an indication from the proxy module to the first version of the device driver that specifies whether another version of the device driver is already loaded on the system and managing the device; and
register with the OS as the first version of the device driver and emulate the first version of the device driver to the OS, responsive to determining no other versions of the device driver are loaded on the system and managing the device.

2. The system as recited in claim 1, wherein the processor is further configured to:
load a second version of the device driver different from the first version of the device driver configured to manage interactions between the device and the one or more software applications;

register the second version of the device driver with the proxy module;
provide, to the second version of the device driver by the proxy module, a pointer which points to the first version of the device driver; and
request, by the second version of the device driver via the pointer, state information from the first version of the device driver.

3. The system as recited in claim 2, wherein the processor is further configured to:
generate one or more requests to stop one or more external stimuli threads;
wait for the one or more external stimuli threads to stop; and
transfer control of the device from the first version of the device driver to the second version of the device driver responsive to the one or more external stimuli threads stopping.

4. The system as recited in claim 2, wherein the processor is further configured to:
transfer state information from the first version of the device driver to the second version of the device driver;
transfer control of the device from the first version of the device driver to the second version of the device driver; and
deactivate the first version of the device driver.

5. The system as recited in claim 4, wherein the processor is configured to execute the proxy module to notify the second version of the device driver to skip hardware initialization of the device responsive to determining the first version of the device driver is loaded on the system and managing the device.

6. The system as recited in claim 4, wherein the processor is further configured to:
transfer static data from the first version of the device driver to the second version of the device driver;
quiesce the first version of the device driver; and
transfer transient data from the first version of the device driver to the second version of the device driver subsequent to quiescing the first version of the device driver.

7. The system as recited in claim 1, wherein the processor is further configured to:
provide a first indication from the proxy module to the first version of the device driver if no other device driver is currently managing the device; and
provide a second indication from the proxy module to the first version of the device driver if another device driver is currently managing the device, wherein the second indication is different from the first indication.

8. A method comprising:
executing program instructions of a first version of a device driver to register the first version of the device driver with a proxy module, wherein the first version of the device driver is configured to manage interactions between a device and one or more software applications;
wherein subsequent to registering the first version of the device driver with the proxy module:
executing program instructions of the proxy module to provide an indication from the proxy module to the first version of the device driver that specifies whether another version of the device driver is already loaded on the system and managing the device; and
registering with the OS as the first version of the device driver and emulating the first version of the device driver to the OS, responsive to determining no other versions of the device driver are loaded on the system and managing the device.

9. The method as recited in claim 8, further comprising:
loading a second version of the device driver, wherein the second version of the device driver is configured to manage interactions between the device and the one or more software applications, and wherein the second version of the device driver is different from the first version of the device driver;
registering the second version of the device driver with the proxy module;
providing, to the second version of the device driver by the proxy module, a pointer which points to the first version of the device driver; and
requesting, by the second version of the device driver via the pointer, state information from the first version of the device driver.

10. The method as recited in claim 9, further comprising:
generating one or more requests to stop one or more external stimuli threads;
waiting for the one or more external stimuli threads to stop; and
transferring control of the device from the first version of the device driver to the second version of the device driver responsive to the one or more external stimuli threads stopping.

11. The method as recited in claim 9, further comprising:
transferring state information from the first version of the device driver to the second version of the device driver;
transferring control of the device from the first version of the device driver to the second version of the device driver; and
deactivating the first version of the device driver.

12. The method as recited in claim 11, further comprising executing the proxy module to notify the second version of the device driver to skip hardware initialization of the device responsive to determining the first version of the device driver is loaded on the system and managing the device.

13. The method as recited in claim 11, further comprising:
transferring static data from the first version of the device driver to the second version of the device driver;
quiescing the first version of the device driver; and
transferring transient data from the first version of the device driver to the second version of the device driver subsequent to quiescing the first version of the device driver.

14. The method as recited in claim 8, wherein the processor is further configured to:
providing a first indication from the proxy module to the first version of the device driver if no other device driver is currently managing the device; and
providing a second indication from the proxy module to the first version of the device driver if another device driver is currently managing the device, wherein the second indication is different from the first indication.

15. A non-transitory computer readable storage medium comprising program instructions executable by a processor to:
register a first version of a device driver with a proxy module, wherein the first version of the device driver is configured to manage interactions between a device and one or more software applications;
wherein subsequent to registering the first version of the device driver with the proxy module:
provide an indication from the proxy module to the first version of the device driver that specifies whether another version of the device driver is already loaded on the system and managing the device; and register the proxy module with the OS on behalf of the first version of the device driver and emulate, by the proxy server, the first version of the device driver to the OS, responsive to determining no other versions of the device driver are managing the device.

16. The non-transitory computer readable storage medium as recited in claim 15, wherein the program instruction are further executable to:

load a second version of the device driver different from the first version of the device driver configured to manage interactions between the device and the one or more software applications;

register the second version of the device driver with the proxy module;

provide, to the second version of the device driver by the proxy module, a pointer which points to the first version of the device driver; and request, by the second version of the device driver via the pointer, state information from the first version of the device driver.

17. The non-transitory computer readable storage medium as recited in claim 16, wherein the program instruction are further executable to:

generate a request for one or more external stimuli threads to stop;

wait for the one or more external stimuli threads to stop; and transfer control of the device from the first version of the device driver to the second version of the device driver responsive to the one or more external stimuli threads stopping.

18. The non-transitory computer readable storage medium as recited in claim 16, wherein the program instruction are further executable to:

transfer state information from the first version of the device driver to the second version of the device driver;

transfer control of the device from the first version of the device driver to the second version of the device driver; and deactivate the first version of the device driver.

19. The non-transitory computer readable storage medium as recited in claim 18, wherein the program instruction are further executable to execute the proxy module to notify the second version of the device driver to skip hardware initialization of the device responsive to determining the first version of the device driver is loaded on the system and managing the device.

20. The non-transitory computer readable storage medium as recited in claim 18, wherein the program instruction are further executable to:

transfer static data from the first version of the device driver to the second version of the device driver;

quiesce the first version of the device driver; and transfer transient data from the first version of the device driver to the second version of the device driver subsequent to quiescing the first version of the device driver.

* * * * *